Oct. 27, 1942.        B. F. MAYERS        2,300,000
INSTRUMENT FOR INDICATING ATMOSPHERIC CONDITIONS
Filed March 14, 1941
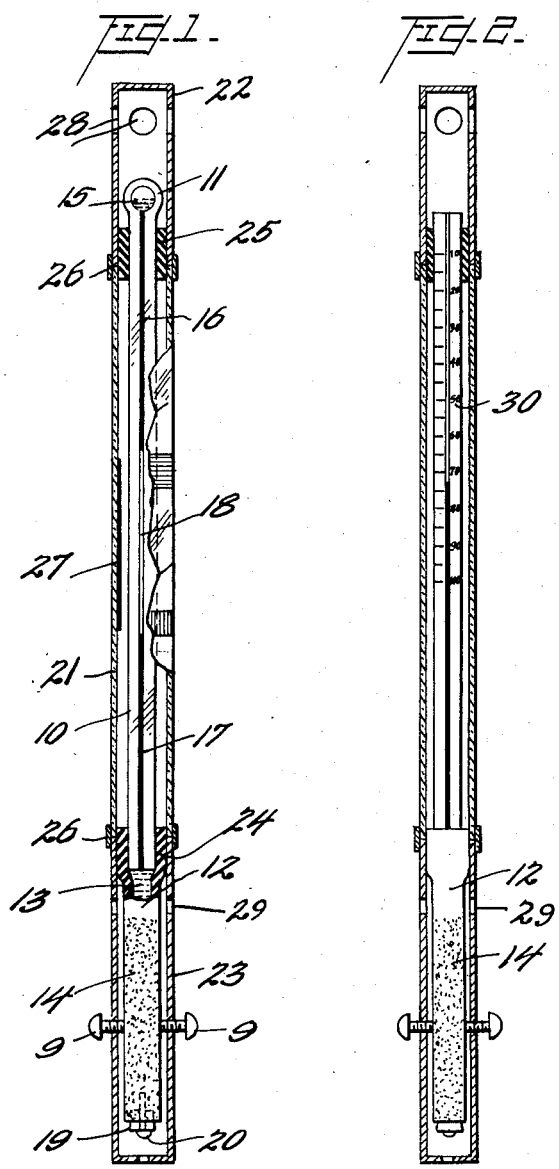
Inventor
Bertram F. Mayers
By J. R. Paris.
Attorney

Patented Oct. 27, 1942

2,300,000

UNITED STATES PATENT OFFICE 2,300,000

INSTRUMENT FOR INDICATING ATMOSPHERIC CONDITIONS

Bertram F. Mayers, Valley Stream, N. Y.

Application March 14, 1941, Serial No. 383,408

13 Claims. (Cl. 73—336)

The present invention relates generally to instruments responsive to atmospheric conditions such as barometric pressure, or humidity and relates further to such instruments which may be responsive to the resultant effect of several such atmospheric conditions such as temperature, pressure and humidity.

One of the objects of the present invention is to provide a compact, rugged, simple instrument which may be cheap to manufacture and which requires a minimum of manipulation or attention by the user.

The several principles employed in the present invention are capable of adaptation to several types of instruments. Thus in one form of the invention, disclosed and more fully described in later portions of the present specification, a capillary tube is employed in combination with a thin-walled, flexible well at one end of the tube and a bulbous enlargement at the other end of the tube. By means of liquid in the well and in only a portion of the bulbous enlargement at the opposite end of the tube, leaving the bulb largely filled with air, three zones are established in the capillary passage of which the two end zones are responsive to atmospheric conditions and the intermediate zone is thereby made to indicate atmospheric conditions by its position along the length of the tube. In this type of instrument one of the end zones is responsive to barometric pressure, humidity and temperature and the other end zone is responsive to temperature, thereby rendering the entire instrument responsive to changes in atmospheric conditions which serve to foretell changes in weather conditions.

In another type of instrument embodying some of the principles of the present invention, the capillary tube is open at one end and provided with a thin-walled, flexible well at the other end filled with non-volatile indicating liquid. The sack or well is provided with a coating of hygroscopic material so that it is responsive to changes in the moisture content of the air.

Another object of the present invention is to provide an instrument for measuring the humidity of the atmosphere.

In the drawing:

Fig. 1 shows a baroscope or weather forecaster which embodies all of the principles of the present invention;

Fig. 2 shows a hygrometer.

The instrument shown in Fig. 1 is designed as a baroscope or weather forecaster which is responsive to the atmospheric pressure, humidity and temperature. It comprises the capillary tubing 10 which is provided with a slight relatively small bulbous enlargement 11 at one end thereof and a well or sack 12 made of any suitable yieldable material at the other end thereof. The material of which the well or sack 12 is made is impermeable and retains the indicating liquid 13 without absorption and without any other loss. The well 12 is yieldable so that it may contract in volume with increased atmospheric pressure and expand with a decrease in atmospheric pressure. While any suitable material that possesses these qualities may be employed, I prefer to employ a thin-walled rubber tube of the type commonly referred to as intra-veinous rubber tubing.

In addition and for the purpose of rendering this instrument responsive to variations in the relative humidity of the atmosphere, the sack 12 is provided with a thin adherent coating 14 of a hygroscopic material which has the quality of expanding with an increase in the relative humidity of the atmosphere and contracting with a decrease in the relative humidity of the atmosphere. The coating 14 employed in the present invention consists primarily of a cellulose derivative such as cellulose nitrate and acetone or any other suitable solvent. The chamber 12 is dipped for about one minute in a solution of equal parts of a nitrocellulose cement and acetone. After drying, the thin adherent coating of nitrocellulose is responsive to the relative humidity of the atmosphere. It takes on moisture from the air with an increase in its relative humidity and the coating expands with the consequent expansion of the sack 12. Contrariwise, with a decrease in the relative humidity of the atmosphere the moisture content of the coating is reduced with a consequent contraction of the well or sack 12.

The sack 12 is filled with any suitable non-volatile liquid 13. A mixture consisting of 50% ethylene glycol sold on the market under the trade-name of "Dupont Zerex," 35% of distilled water and 15% of Burnett's color has been found suitable for this purpose.

The upper end of the capillary tubing 10 is provided with a slight bulbous enlargement 11. This bulbous enlargement 11 is largely filled with air and contains a minute amount of liquid as indicated at 15, which liquid also extends into the capillary tubing as shown at 16. Similarly the liquid 13 from the well or sack 12 extends in the form of a short column 17 up the capillary tubing. The columns 16 and 17 are spaced from each other by the air-filled zone 18. By this means two end zones 16 and 17 and an intermediate indicating zone 18 are established in the capillary. The end zones are responsive to changes in atmospheric conditions and thereby bring about a shifting in position of the intermediate indicating zone 18 along the length of the capillary tubing, the position of this intermediate zone thereby serving to indicate changes in atmospheric conditions and forecasts changes in weather conditions.

The lower end of the well or sack 12 is closed by the stopper 19 which carries the split rivet 20.

The organization thus far described is preferably disposed within a protective casing consisting of the transparent tubular portion 21, upper perforated metal cap 22 and lower perforated metal cap 23. The lower end of the transparent portion 21 and the upper end of the metal cap 23 fit snugly over the slightly distended portion 24 of the well or sack 12 which engages the lower end of the capillary tubing 10. By this means, the well 12 is firmly sealed on to the lower end of the capillary tubing 10. The tubular spacing element 25 is carried by the upper end of the capillary tubing 10 and this element 25 serves as a spacer between the capillary tubing 10 and the protective casing. An ornamental sealing band 26 is employed over the joints between the transparent tubing 21 and the adjacent metal caps.

For the purpose of facilitating the observation and reading of this instrument, an intermediate portion of the transparent tubing 21 is provided with an opaque covering 27. The covering 27 has a length which is approximately equal to the length of the zone 18. In consequence under normal conditions the zone 18 is concealed from view, thereby indicating that the weather will be mixed and variable. Under normal conditions, therefore, the instrument would appear to be filled with the colored indicating liquid. When atmospheric conditions change in such a manner as to indicate an early storm, the zones 16 and 17 will travel downwardly, thereby exposing the indicating zone 18 below the opaque portion 27 and thus indicating an early storm. Contrariwise, when the changes indicate fair weather the zones 16 and 17 will travel upwardly and thus expose the indicating zone 18 above the opaque portion 27 to indicate fair weather. The lower cap 23 carries one or more screws 9 which abut the well 12. When the device is installed for use in any particular locality, the instrument is exposed to the local weather conditions and the screws 9 are adjusted so that the instrument indicates in accordance with the official forecast for the locality. When the official forecast is "Fair tonight and tomorrow," the gap should be set quite high—that is, at least one inch of the gap should appear above the opaque covering 27. But if the forecast is for "Fair tonight—rain tomorrow" the gap should be set not quite so high—say one-half inch above the blue line.

If the forecast is for "Cloudy tonight and tomorrow" the gap should be set about in the middle—with a small part of it visible both above and below the zone 27.

If the forecast is for "Cloudy, followed by rain or snow" the gap should be set about half an inch below the zone 27.

If the forecast is for "Rain or snow tonight and tomorrow" the gap should be set with about an inch of clear space below the zone 27.

At the first setting, avoid too low a setting, unless an exceptionally severe storm is in progress at the time, as the gap must not be set so low that a bad storm would cause the lower portion of the colored fluid to sink below the lower edge of the glass.

It may be found that subsequent action of the baroscope indicates that the first adjustment was not completely accurate. If so, it is necessary merely to make minor adjustment to the point where the position of the gap would have been correct had it been set slightly higher or lower in the first place.

In climates where there is a wide variation between summer and winter temperatures, it will be necessary to make slight adjustments by means of the set-screws as the seasons change. The tendency of the gap is to sink somewhat as the normal temperature rises and to rise as the normal temperature falls. The necessity for such adjustment will be clearly indicated by a tendency to read slightly low as winter passes into spring and summer; conversely by a tendency to read a bit high as summer passes into fall and winter.

The present device is self-compensating for normal diurnal changes in temperatures and humidity and is responsive only to a substantial change in pressure, or to a continued change in both pressure and relative humidity, or to a sudden change in all factors. Gradual changes in temperature affect the well 12, as well as the air-filled bulb 11. The sudden drop in temperature at night is accompanied by an increase in relative humidity and these effects counterbalance. Similarly, the rise in temperature from morning to midday is accompanied by a decrease in humidity and also balance each other. Likewise, the responsiveness of the bulb 11, which is in effect an air thermometer, is such that in abnormal changes it cooperates with the well so as to give the proper forecast. Thus, when conditions are such that the atmosphere is being dried at a greater relative rate than it is being heated, or vice versa, the instrument will give the proper indications.

As an example we may assume that during the night a current of relatively damp air, either in cloud form, or uncondensed, prevents normal radiation of the heat accumulated by the earth during the day, the temperature remains high during the night. This exerts a depressing effect on the baroscope signal. When the sun rises next morning, if it is able to penetrate the clouds or uncondenser upper layer of damp air, it does so with reduced intensity resulting in somewhat higher temperature but little or no drying in the lower air. This tends to depress the baroscope signal further and is, of course, a clear indication of the presence of a current of equatorial air aloft which is a usual accompaniment of storm development.

On the other hand, when upper air is relatively dry and clear at night, the nocturnal "long-wave" radiation is unimpeded resulting in the normal drop in temperature. This exerts a lifting effect on the baroscope signal (modified somewhat by increased humidity, as a rule). Then when the sun rises next morning, it readily penetrates the upper atmosphere with a strong drying effect upon the lower levels. A vigorous rise in the baroscope results as the temperature rise under these conditions is moderate due to the lower water vapor values available for heat accumulation.

In the construction of the present device, I employ for the capillary tubing 10 thermometer tubing having a bore gauge of approximately .25 mm. to .35 mm. and the bulbous enlargement 11 has a capacity of from .08 to .12 cc.

The well or sack 12 is made of intra-veinous rubber tubing having an inside diameter of about 5 mm. and an outside diameter of about 7 mm. I employ a piece of tubing having an overall length of 60 mm. One centimeter overlaps the thermometer tubing 10 and a fraction of a centimeter is taken up by the plug 19, leaving a well or reservoir about 45 mm. long. With these dimensions the thermometer tubing need not be more than ten to fifteen centimeters long and the entire instrument may be only 20 to 25 centimeters long. These dimensions may of course be departed from by any person skilled in the art. These, however, indicate approximately the desirable relation between these dimensions for the best results.

Before coating the rubber sack 12 with the hygroscopic coating consisting of equal parts of nitrocellulose cement and acetone, I prefer to provide the rubber sack with a priming or filling undercoat. This is comprised of 10% cellulose nitrate solution, or nitrocellulose cement, 15% glycerine and 75% acetone. This has the effect of preserving the flexibility of the rubber and also serves as a binder for the final hygroscopic coating.

I prefer that the hygroscopic coating be applied in such a manner that it provides an area properly proportioned with relation to the remaining factors discussed hereinabove. With the dimensions given above, I find the hygroscopic coating should cover all of the lower portion of the well 12 up to a line about 12 to 15 mm. below the top of the tube. This gives the proper surface of responsive hygroscopic coating and in addition it is not exposed to variations in the air currents around the vent holes 29 and it is protected from sunlight.

The instrument shown in Fig. 2 is a substantial duplicate of the instrument shown in Fig. 1, except that the bulbous enlargement 11 is omitted and the upper end of the capillary tubing is exposed to the atmosphere. The column of liquid is therefore exposed to the atmospheric pressure at both ends and is not responsive thereto. The well or sack 12, however, because it is provided with the hygroscopic coating 14, is responsive to variations in the relative humidity of the atmosphere and the present instrument therefore constitutes a hygrometer and indicates the relative humidity of the atmosphere which may be readily calibrated and the percentage of humidity may be then indicated as shown by the scale 30.

The caps 22 in Figs. 1 and 2 have vent holes 28. The opaque section 27 divides the instrument into three indicating zones and serves in lieu of scales or other indicia. Thus, when the indicating zone (the gap in Fig. 1) is in approximate registry with the opaque section, the indication is that the weather will be mixed and uncertain; and when the indicating zone in the capillary is exposed above the opaque sections, fair weather is indicated and below, storm is indicated. The opaque zone therefore facilitates the ready reading of the instrument. It will be understood, however, that the opaque section may be discontinuous, such as split into two somewhat spaced opaque sections so as to display between them the section of liquid.

Modifications of the present embodiments, falling within the scope of the appended claims, will be apparent to persons skilled in the art.

I claim:

1. An instrument for indicating changes in atmospheric conditions comprising a length of straight transparent capillary tubing, the capillary passage having a relatively small, sealed, gas-filled, bulbous enlargement at one end thereof, a relatively large well of yieldable material sealed to the other end of said tubing, said well having the property of varying its volume with variations in pressure and humidity of the ambient atmosphere, and liquid in the well and in the bulbous enlargement and extending therefrom into the capillary and toward each other, the capillary ends of the two columns of liquid being spaced a substantial distance, this space constituting an indicating zone which is movable along the length of the tube in response to the combined effect of pressure temperature and humidity of the atmosphere.

2. An instrument for indicating changes in atmospheric conditions comprising a length of straight transparent capillary tubing, the capillary passage having a relatively small, sealed, gas-filled, bulbous enlargement at one end thereof, a relatively large well of yieldable material sealed to the other end of said tubing, said well having the property of varying its volume with variations in pressure and humidity of the ambient atmosphere, liquid in the well and in the bulbous enlargement and extending therefrom into the capillary and toward each other, the capillary ends of the two columns of liquid being spaced a substantial distance, this space constituting an indicating zone which is movable along the length of the tube in response to the combined effect of pressure temperature and humidity of the atmosphere, and a casing of transparent material enclosing said tubing, said casing having an opaque portion in registry with the normal position of said indicating space.

3. An instrument for indicating changes in atmospheric conditions comprising a length of straight transparent capillary tubing, the capillary passage having a relatively small, sealed, gas-filled, bulbous enlargement at one end thereof, a relatively large well of yieldable material sealed to the other end of said tubing, said well having the property of varying its volume with variations in pressure and humidity of the ambient atmosphere, liquid in the well and in the bulbous enlargement and extending therefrom into the capillary and toward each other, the capillary ends of the two columns of liquid being spaced a substantial distance, this space constituting an indicating zone which is movable along the length of the tube in response to the combined effect of pressure temperature and humidity of the atmosphere, a casing of transparent material enclosing said tubing, said casing having an opaque portion in registry with the normal position of said indicating space, and a perforated metal cap enclosing said well.

4. An instrument for indicating changes in atmospheric conditions comprising a length of straight transparent capillary tubing, the capillary passage having a relatively small, sealed, gas-filled, bulbous enlargement at one end thereof, a relatively large well of yieldable material sealed to the other end of said tubing, said well having the property of varying its volume with variations in pressure and humidity of the ambient atmosphere, liquid in the well and in the bulbous enlargement and extending therefrom into the capillary and toward each other, the capillary ends of the two columns of liquid being spaced a substantial distance, this space constituting an indicating zone which is movable along the length of the tube in response to the combined effect of pressure temperature and humidity of the atmosphere, a casing of transparent material enclosing said tubing, said casing having an opaque portion in registry with the normal position of said indicating space, and a perforated metal cap enclosing said well, said metal cap carrying a movable element contacting said well for adjusting the position of said indicating space.

5. An instrument for indicating changes in atmospheric conditions comprising a length of straight transparent capillary tubing, the capillary passage having a relatively small, sealed, gas-filled, bulbous enlargement at one end thereof, a relatively large well of yieldable material sealed to the other end of said tubing, said well having the property of varying its volume with variations in pressure and humidity of the ambient atmosphere, liquid in the well and in the bulbous enlargement and extending therefrom into the capillary and toward each other, the capillary ends of the two columns of liquid being spaced a substantial distance, this space constituting an indicating zone which is movable along the length of the tube in response to the combined effect of pressure temperature and humidity of the atmosphere, a casing of transparent material enclosing said tubing, said casing having an opaque portion in registry with the normal position of said indicating space, a perforated metal cap enclosing said well and another perforated metal cap enclosing said bulbous enlargement.

6. An instrument for indicating changes in atmospheric conditions comprising a length of straight transparent capillary tubing, the capillary passage having a relatively small, sealed, gas-filled bulbous enlargement at one end thereof, a relatively large well of yieldable material sealed to the other end of said tubing, said well having a thin adhering coating of hygroscopic material on its outer face serving to vary the volume of the well with variations in humidity of the atmosphere, and liquid in the well and in the bulbous enlargement and extending therefrom into the capillary and toward each other, the capillary ends of the two columns of liquid being spaced a substantial distance, this space constituting an indicating zone which is movable along the length of the tube in response to the combined effect of pressure temperature and humidity of the atmosphere.

7. An instrument for indicating changes in atmospheric conditions comprising a length of straight transparent capillary tubing, the capillary passage having a relatively small, sealed, gas-filled, bulbous enlargement at one end thereof, a relatively large well of yieldable material sealed to the other end of said tubing, said well having a thin adhering coating of hygroscopic cellulose derivative on its outer face serving to vary the volume of the well with variations in humidity of the atmosphere, and liquid in the well and in the bulbous enlargement and extending therefrom into the capillary and toward each other, the capillary ends of the two columns of liquid being spaced a substantial distance, this space constituting an indicating zone which is movable along the length of the tube in response to the combined effect of pressure temperature and humidity of the atmosphere.

8. An instrument for indicating changes in atmospheric conditions comprising a length of straight transparent capillary tubing, a relatively large well of yieldable material sealed to one end of said tubing, said well having a thin adhering coating of hygroscopic material on its outer face serving to vary the volume of the well with variations in the humidity of the atmosphere, and liquid in the well and extending within the capillary.

9. An instrument for indicating changes in atmospheric conditions comprising a length of straight transparent capillary tubing, a relatively large well of yieldable material sealed to one end of said tubing, said well having a thin adhering coating of hygroscopic cellulose derivative on its outer face serving to vary the volume of the well with variations in the humidity of the atmosphere, and liquid in the well and extending within the capillary.

10. An instrument for indicating changes in atmospheric conditions comprising a length of straight transparent capillary tubing, a relatively large well of thin-walled rubber tubing sealed to one end of said tubing, said well having a thin adhering coating of hygroscopic cellulose derivative on its outer face serving to vary the volume of the well with variations in the humidity of the atmosphere, and liquid in the well and extending within the capillary.

11. A pocket weather forecaster comprising a length of straight transparent capillary tubing, the capillary passage having a relatively small, sealed, air-filled, bulbous enlargement at one end thereof, said bulbous enlargement having a small amount of non-volatile liquid extending a short distance into the capillary passage, a relatively large well of thin-walled rubber tubing sealed to the other end of said capillary tubing, said well having a thin adhering coating of hygroscopic cellulosic material on its outer face, non-volatile liquid in the well and extending therefrom into the capillary tubing to a point spaced from the end of the liquid extending from the bulbous enlargement, the liquid in the capillary thus dividing the same into two end zones and an intermediate zone, the end zones being responsive to atmospheric conditions and thereby jointly determining the position of the intermediate zone along the length of the capillary to indicate atmospheric conditions, and a protective casing for said capillary tube, well and bulb, the casing having an intermediate transparent portion, said casing also being perforated near the bulb and well.

12. An instrument for indicating changes in a condition of the atmosphere, said instrument comprising a sack of yieldable material, a length of transparent capillary tubing sealed to the open end of said sack, non-volatile liquid filling said sack and the adjacent portion of the capillary tubing, and an adherent coating on the outer face of the sack, said coating having the property of contracting and expanding the sack in response to variations in the moisture of the atmosphere.

13. A hygrometer comprising a thin-walled rubber sack, a length of transparent capillary tubing sealed to the open end of the sack, non-volatile liquid filling said sack and the adjacent part of the capillary tubing and an adherent nitro cellulose on the exterior of said sack having the property of expanding and contracting the sack with the rise and fall of the moisture content of the atmosphere.

BERTRAM F. MAYERS.